United States Patent
Hatlestad et al.

(10) Patent No.: US 7,153,136 B2
(45) Date of Patent: Dec. 26, 2006

(54) FREE FALL SIMULATOR

(75) Inventors: Kathryn W. Hatlestad, Maplewood, MN (US); Bruce C. Lindahl, St. Louis Park, MN (US); Kent J. Moses, Burnsville, MN (US)

(73) Assignee: Aero Systems Engineering, Inc., St. Paul, MN (US)

( * ) Notice: Subject to any disclaimer, the term of this patent is extended or adjusted under 35 U.S.C. 154(b) by 0 days.

(21) Appl. No.: 10/643,202

(22) Filed: Aug. 18, 2003

(65) Prior Publication Data

US 2004/0115593 A1    Jun. 17, 2004

Related U.S. Application Data

(60) Provisional application No. 60/404,891, filed on Aug. 20, 2002.

(51) Int. Cl.
    *G09B 19/16* (2006.01)
(52) U.S. Cl. ...................................................... 434/59
(58) Field of Classification Search .................. 434/29, 434/30, 48, 49, 53, 54, 59; 273/49, 130, 273/137
    See application file for complete search history.

(56) References Cited

U.S. PATENT DOCUMENTS

| | | |
|---|---|---|
| 2,486,287 A | 10/1949 | Jackson |
| 2,560,634 A | 7/1951 | Colley et al. |
| 2,788,020 A | 4/1957 | Davie, Jr. |
| 2,799,161 A | 7/1957 | Greene et al. |
| 2,933,922 A | 4/1960 | Davis |
| 4,308,748 A | 1/1982 | Jacocks |
| 4,457,509 A | 7/1984 | St-Germain |
| 4,487,410 A | 12/1984 | Sassak |
| 4,535,983 A * | 8/1985 | De-La-Concha-Caceres ....... 472/137 |
| 4,578,037 A * | 3/1986 | Macangus et al. ........ 434/258 |
| 4,700,565 A | 10/1987 | Albuschkat |
| 5,046,358 A | 9/1991 | Wulf et al. |
| 5,209,702 A * | 5/1993 | Arenas ................ 472/136 |
| 5,417,615 A | 5/1995 | Beard |
| 5,452,609 A | 9/1995 | Bouis |
| 5,593,352 A * | 1/1997 | Methfessel et al. ...... 472/50 |
| 5,655,909 A * | 8/1997 | Kitchen et al. ........... 434/44 |
| 5,753,811 A | 5/1998 | Consolini |
| D397,799 S | 9/1998 | Kitchen |
| 5,865,690 A * | 2/1999 | Giannoutsos ............ 473/415 |
| 6,042,490 A * | 3/2000 | Lenhart .................. 473/415 |
| 6,083,110 A * | 7/2000 | Kitchen et al. ........... 472/49 |
| 6,315,672 B1 | 11/2001 | Gillot et al. |

FOREIGN PATENT DOCUMENTS

| | | |
|---|---|---|
| GB | 2 094 163 A | 9/1982 |
| GB | 2288772 | * 1/1995 |
| GB | 2 288 772 A | 11/1995 |
| JP | 08299515 | * 11/1996 |
| WO | WO 83/01380 | 4/1983 |
| WO | WO 96/27866 | 9/1996 |

OTHER PUBLICATIONS

Agard Memorandum, "Papers Presented at the Sixth Meeting of the Wind Tunnel and Model Testing Panel", Nov. 6, 1954; (pp. 399-440).

Calspan, "8-Foot Transonic Wind Tunnel", Calspan Report No. WTO-300; (Revised Oct. 1971) (67pgs).

(Continued)

*Primary Examiner*—Kurt Fernstrom
(74) *Attorney, Agent, or Firm*—Dorsey & Whitney LLP

(57) ABSTRACT

A free fall simulator with a flight chamber, a fan system to generate airflow in the flight chamber, and a noise attenuation housing substantially enclosing the fan system.

14 Claims, 18 Drawing Sheets

OTHER PUBLICATIONS

"Low Speed Wind Tunnel Investigations Branch, Guidelines for Peparation of Software and Instrumentation Test Requirements", Jun. 1982 (Revised Jan. 1984), Appendix A.

"Guide for Planning Investigations in the Armes 40- by 80- ft Wind Tunnel Operated by Low Speed Wind Tunnel Investigations Branch (FHW)", National Aeornautics and Space Adminstration NASA, Mar. 1984 (52pgs).

"Be Ready for the Real Thing", ASE Free Fall Simulators, Free Fall Brochure.doc, Nov. 2000 2000 (22pgs)—Identified as Exhibit A.

"Just Like the Real Thing", ASE Free Fall Simulators, FFS Entertainment Brochure.doc, Nov. 2001 (8pgs)—Identified as Exhibit B.

Glenn L. Martin Wind Tunnel, "Solving Problems Through Advanced Technology", Publication Date Unknown; (8pgs).

Lockheed Aeronautical System Company, "Compressible Flow Wind Tunnel", Publication Date Unknown; (29pgs).

Study Report for Free Fall Simulator (FFS), Aero Systems Engineering, Dec. 2000 (48pgs)—Identified as Exhibit C.

Closed-Circuit Freefall Simulator Rev. 0, Marissa Partners, ASE Quote No. Q02-W02-7171 (Sep. 11, 2002); (18pgs);—Idenitifed as Exhibit D.

Declaration of Donald Kamis.

* cited by examiner

FREE FALL SIMULATOR

CROSS-REFERENCE TO RELATED APPLICATION(S)

The present application claims the benefit of priority of U.S. Provisional Application 60/404,891, filed on Aug. 20, 2002.

FIELD OF THE INVENTION

The present invention relates generally to free fall simulators and more specifically to a free fall simulator incorporating an improved noise reduction system and an improved ingress and egress system.

BACKGROUND OF THE INVENTION

A free fall simulator is essentially a vertical wind tunnel in which an upward flow or column of air is generated with sufficient velocity to produce a dynamic pressure high enough to suspend a person against the force of gravity. This enables the user to experience all the effects of free fall in a controlled, safe environment. Accordingly, with a free fall simulator, a user can experience the aerodynamic forces and the effects of body movements during free fall without jumping from an aircraft. Free fall simulators have become more popular in recent years because of the significant benefits and cost savings associated with free fall training in a free fall simulator compared to conventional free fall training from an aircraft, and because of the desire of the general public to experience free fall without the dangers and risks associated with jumping from an aircraft. Accordingly, in addition to military and other sky diving training facilities, free fall simulators are being considered for recreation purposes at fairs, carnivals, or the like where they can be used by the general public for experiencing free fall.

A variety of free fall simulators are known in the prior art. Specifically, a free fall simulator installed at Ft. Bragg, North Carolina for the U.S. Army comprises a recirculating system in which a single fan above the flight chamber creates a vertical air stream in the flight chamber sufficient to support a user under free fall conditions. Air which passes through the flight chamber is then recirculated to the bottom of the flight chamber for reuse.

U.S. Pat. No. 5,209,702 issued to Rarenas discloses a free fall simulator with a single fan below the flight chamber for producing a stream of air in the flight chamber to support the user.

The Kitchen et al. U.S. Pat. No. 5,655,909 discloses a sky diving simulator in which a plurality of radially positioned fans at the bottom of the simulator provide the stream of air within the flight chamber sufficient to support the user.

The Jean St-Germain U.S. Pat. No. 4,457,509 also provides a single fan at the bottom of the flight chamber but with a recirculating feature in which the air stream, after passing through the flight chamber, is recirculated back to the fan.

The Macangus et al. U.S. Pat. No. 4,578,037 discloses a sky diving simulator in which three inlet fans are provided at the bottom of the simulator and thus below the flight chamber. These fans are positioned at the end of inclined ducts so that the air inlet flows at an inclined angle from the inlet to the bottom of the flight chamber.

The Kitchen et al. U.S. Pat. No. 5,083,110 discloses a vertical wind tunnel training device providing a plurality of fans positioned above the flight chamber for producing a vertical stream of air within the flight chamber. Kitchen also discloses a single fan at the lower end of the device for producing the vertical air stream in a recirculating structure.

Most if not all of the prior art free fall or sky diving simulators are effective for producing a vertical stream of air with sufficient velocity to support a user against the force of gravity. Few, however, have focused on noise reduction. In any free fall or sky diving simulator, significant noise is generated by the fan drive system, by the movement of air through the fan system, and by jet noise generated by the vertical air stream. These noise sources generate broad spectrum noise that can, without careful design considerations, have damaging effects on both human safety and the structural integrity of the simulator. Noise reduction or noise attenuation has become and is becoming of greater importance as free fall and sky diving simulators, which at one time were found primarily at military installations and more remote locations as training facilities for paratroopers, firefighters, sky divers, etc., are now being installed in more populated areas at or near shopping malls, amusement parks and the like for recreational use.

Accordingly, there is a need in the art to provide a free fall or sky diving simulator which provides improved noise attenuation.

A need also exists in the art for a free fall or sky diving simulator which provides an improved ingress/egress system which permits users to enter and exit the flight chamber or an area adjacent to the flight chamber while maintaining adequate air flow and pressure within the flight chamber to support a user against the force of gravity. Conventionally, ingress/egress openings in the flight chamber or in an area adjacent to the flight chamber are provided with a single air lock door which is closed in substantially sealed, air tight condition while the flight chamber is in use and which is designed and intended to be opened only when the air flow in the flight chamber has been reduced. Thus, users entering or exiting from the flight chamber or an area adjacent to the flight chamber are usually required to do so only when the flight chamber is not in use.

With these conventional designs, the fan speed for the flight chamber, and thus the air flow in the flight chamber, is normally reduced when the air lock door is open to allow users to enter or exit the flight chamber or areas adjacent to the flight chamber. Then, after the air lock door has been closed and sealed, the fan speed is increased to provide the necessary air flow to support a user against the force of gravity.

This repeated reduction and increase in the fan speed to allow users to enter or exit the flight chamber or adjacent areas not only results in increased wear and tear on the fan and other components of the system, but results in significant downtime since the system must be at least partially shut down to allow the users to enter and exit through the opened air lock door.

Accordingly, there is a need in the art to provide an improved ingress/egress system by which users can enter or exit from the flight chamber or areas adjacent to the flight chamber continuously, without decreasing the fan speed or significantly altering the use of the flight chamber.

BRIEF SUMMARY OF THE INVENTION

The present invention provides a free fall or sky diving simulator with fan means for producing a vertical stream of air in a flight chamber to support a user in a free fall environment. The present invention also includes a noise reduction or noise attenuation system associated with the simulator which significantly reduces the operational noise when the system is in use and an improved ingress/egress system.

In a preferred embodiment, the simulator includes a flight chamber and a fan means for producing a vertical stream of air in the flight chamber. Preferably, the fan means comprises a plurality of radially extending inlet air ducts below the flight chamber. Each of these ducts is provided with a fan at its outer end. The noise attenuation means in the preferred embodiment includes a noise attenuation housing at the base of the simulator. The noise attenuation housing includes a canopy positioned above and substantially covering the plurality of radially extending air inlet ducts, a plurality of noise attenuation stacks positioned circumferentially at the outer edges of the canopy and wall portions joined with the outer circumferential edges of the canopy and extending between adjacent stacks to substantially enclose the fan means and air inlet system. In the preferred embodiment, each of the noise attenuation stacks is provided with air inlet means or openings at the upper end of the stack and at a position above the level of the air inlet ducts. These air inlet openings are preferably provided at the upper end surface of the stack itself so that the incoming air enters the stack vertically. The openings, if desired, can be provided with noise attenuation baffles.

In a further embodiment of the present invention, one or more of the noise attenuation stacks can be in communication with the air outlet stream above the flight chamber to provide a recirculating or a closed circuit system.

In a still further embodiment, a closed circuit system is provided with selectively controllable exhaust louvers or openings in the return air stream.

In a still further embodiment, a free fall or sky diving simulator is provided in which the air inlet fan means are provided underground or below grade. In this embodiment, the canopy is or may be at approximately ground or grade level and the vertical noise attenuation stacks would be at or above ground level.

A further feature of the present invention includes an improved ingress/egress system which permits entrance into and exit from the flight chamber or an area adjacent to the flight chamber without decreasing the fan speed and without significantly adversely affecting the air flow or dynamic pressure in the flight chamber. In an embodiment of the invention exhibiting this feature, an area adjacent to the flight chamber is provided with a revolving air lock door, a pair of air lock doors or another substantially air lock door system which substantially limits or precludes air flow or pressure loss from the flight chamber while users are entering or exiting from the flight chamber or areas adjacent to the flight chamber.

Accordingly, it is an object of the present invention to provide a free fall or sky diving simulator with improved noise attenuation means with improved noise attenuation means.

Another object of the present invention is to provide a free fall or sky diving simulator having a substantially fully enclosed noise attenuation system.

A further object of the present invention is to provide a noise attenuation system for a free fall or sky diving simulator having a canopy, a plurality of vertically extending noise attenuation stacks and wall sections joining the canopy and adjacent noise attenuation stacks.

A further object of the present invention is to provide an ingress/egress system by which users can enter or exit from the flight chamber or preparation or areas adjacent to the flight chamber without significantly adversely affecting the air flow and dynamic pressure within the flight chamber.

A still further object of the present invention is to provide a free fall or sky diving simulator in which an area adjacent to the flight chamber is provided with a revolving lock door, a pair of air lock doors, or another air lock door system by which a user can enter or exit the system without a significant loss in dynamic air pressure within the flight chamber.

These and other objects of the present invention will become apparent with reference to the drawings, the description of the preferred embodiment and the appended claims.

DETAILED DESCRIPTION

Figure 1:
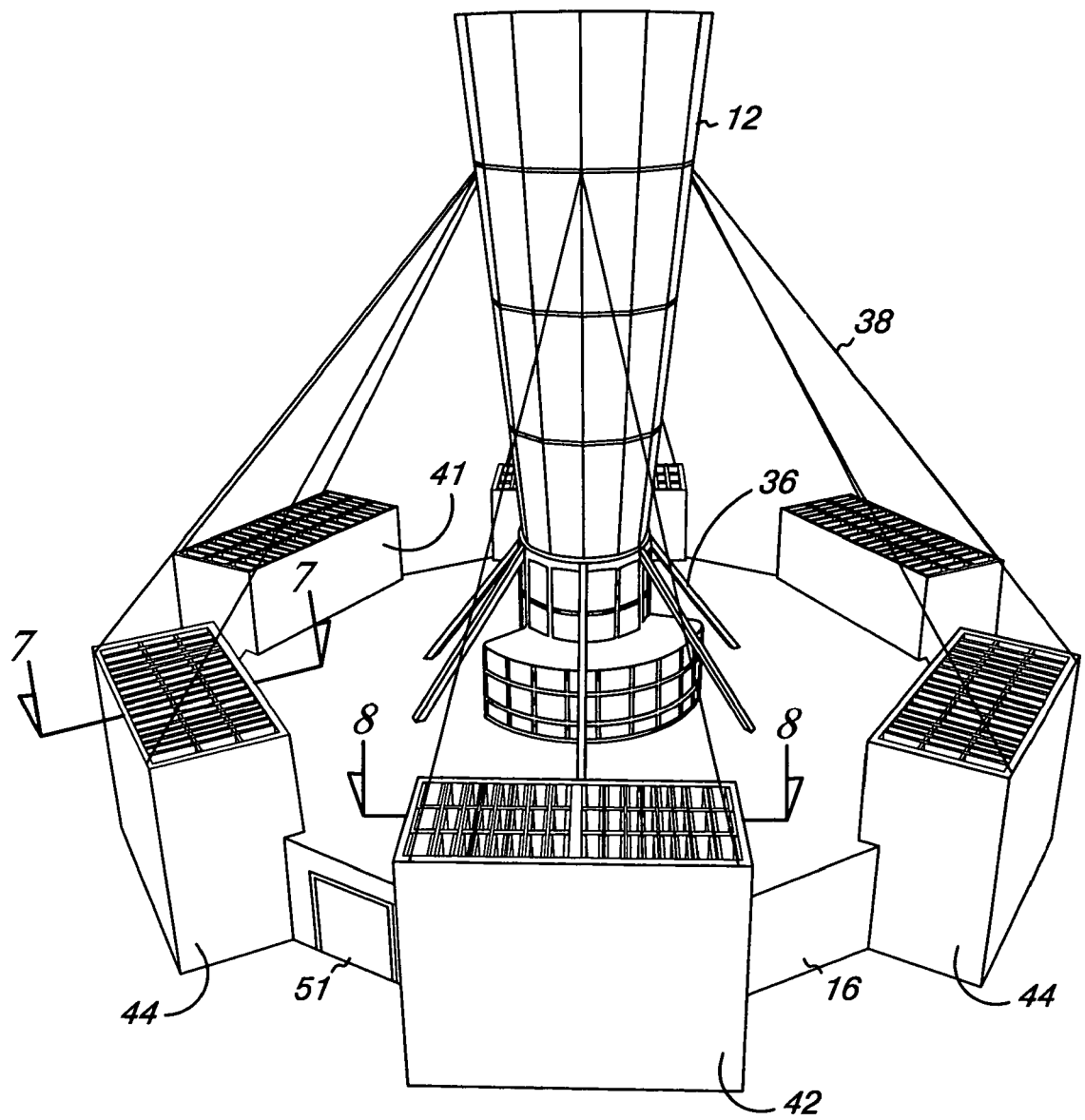
FIG. 1 is an isometric view of a first embodiment of a free fall simulator in accordance with the present invention.

The present invention relates to a free fall or sky diving simulator which hereinafter, unless otherwise specified, will be referred to as a "free fall simulator".

General reference is made to FIGS. 1–4 which disclose various embodiments of a free fall simulator in accordance with the present invention. The free fall simulator in each of the embodiments of FIGS. 1–4 includes a fan means 10 (FIGS. 3 and 4) for generating a vertical air stream or air column in a flight chamber 11. The air stream generated in the flight chamber 11 is designed to be of sufficient velocity to produce a dynamic pressure in the chamber that is high enough to support a user entering the flight chamber in a free fall environment. In other words, the velocity of the air stream within the flight chamber 11 is sufficient to support the user against the force of gravity. The flight chamber 11 may be of any size or diametrical dimension to support a single user or multiple users. A vertical chamber or column 12 is connected with and provided above the flight chamber 11. The diametrical dimension of the chamber 12 at its base approximates the diametrical dimension (and thus the cross-sectional area) of the flight chamber 11 and increases as it extends upwardly.

The free fall simulator of the present invention is also provided with a noise attenuation means in the form of a noise attenuation housing which fully or substantially fully encloses the fan means 10 below the flight chamber 11. In the preferred embodiment, the noise attenuation housing includes a canopy 14, a plurality of noise attenuation stacks 15 positioned circumferentially at the outer edges of the canopy 14 and a plurality of wall sections 16 joined with the outer edges of the canopy 14 and positioned between adjacent stacks 15 to fully enclose or substantially fully enclose the fan means 10.

In accordance with the present invention, the fan means 10 is comprised of a plurality of air intake members comprising a plurality of generally horizontal air intake ducts 18. Each of these air intake ducts 18 has an inner end in communication with a central air intake chamber 19 (FIG. 4) and an open outer end 20. As shown best in FIGS. 3 and 4, these ducts 18 extend radially outwardly from the central chamber 19.

A fan member 21 is provided near the outer end of each of the intake ducts 18 for the purpose of drawing air in through the open outer ends of the ducts 20. Each of the fans is driven by a motor. The particular size and type of motor and the particular size, orientation and configuration of the fan blades are selected so that the fan members for all of the intake ducts collectively provide sufficient air flow within the flight chamber 11 to support the user or users. Proper selection of fan means for this purpose is known in the art. In general, the fans 21 should be sufficient to provide an air stream in the flight chamber 11 of approximately 120 to 160 miles per hour.

Figure 3:
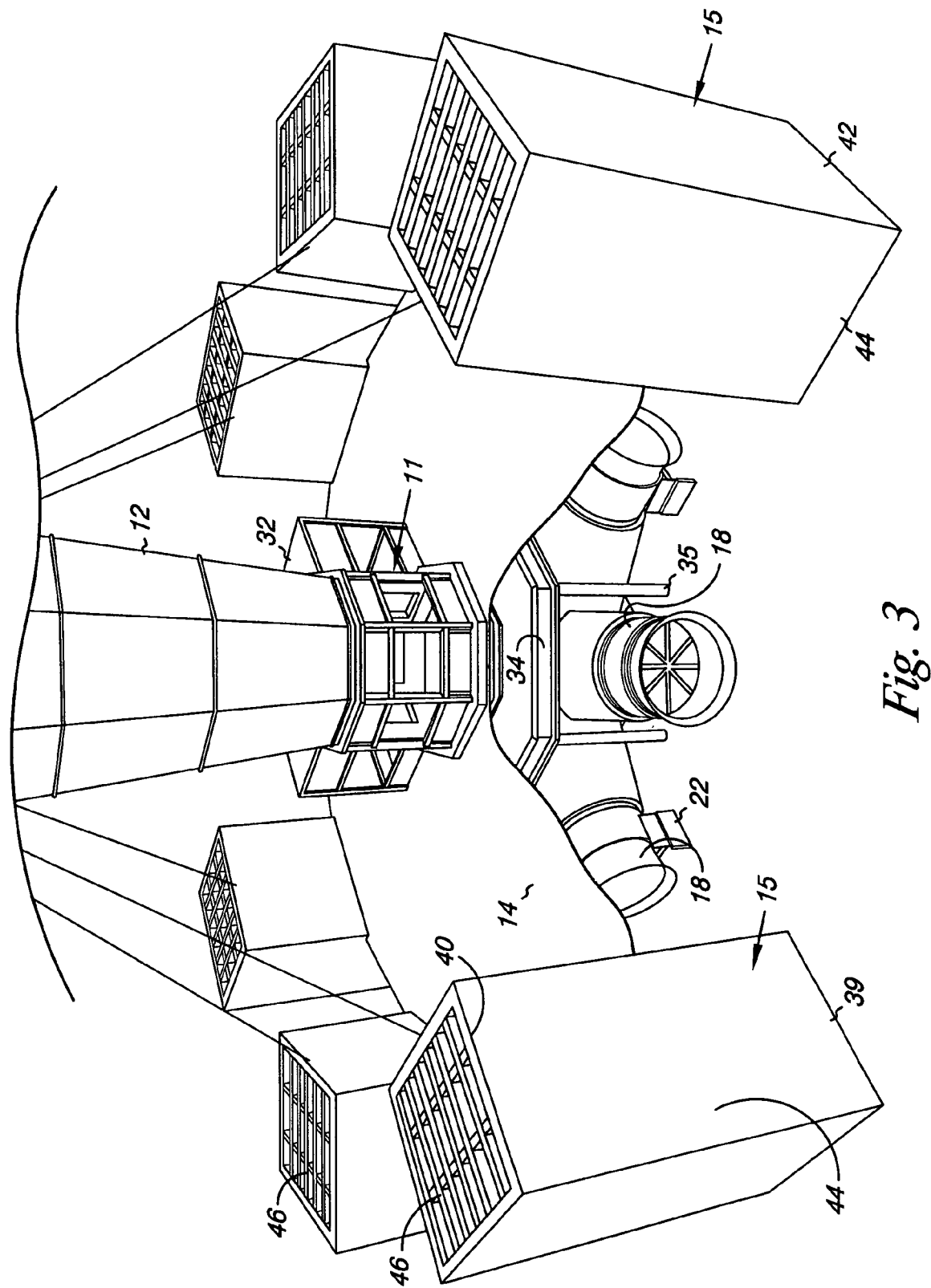
FIG. 3 is an isometric view of a free fall simulator in accordance with the present invention in which a portion has been removed.
Figure 4:
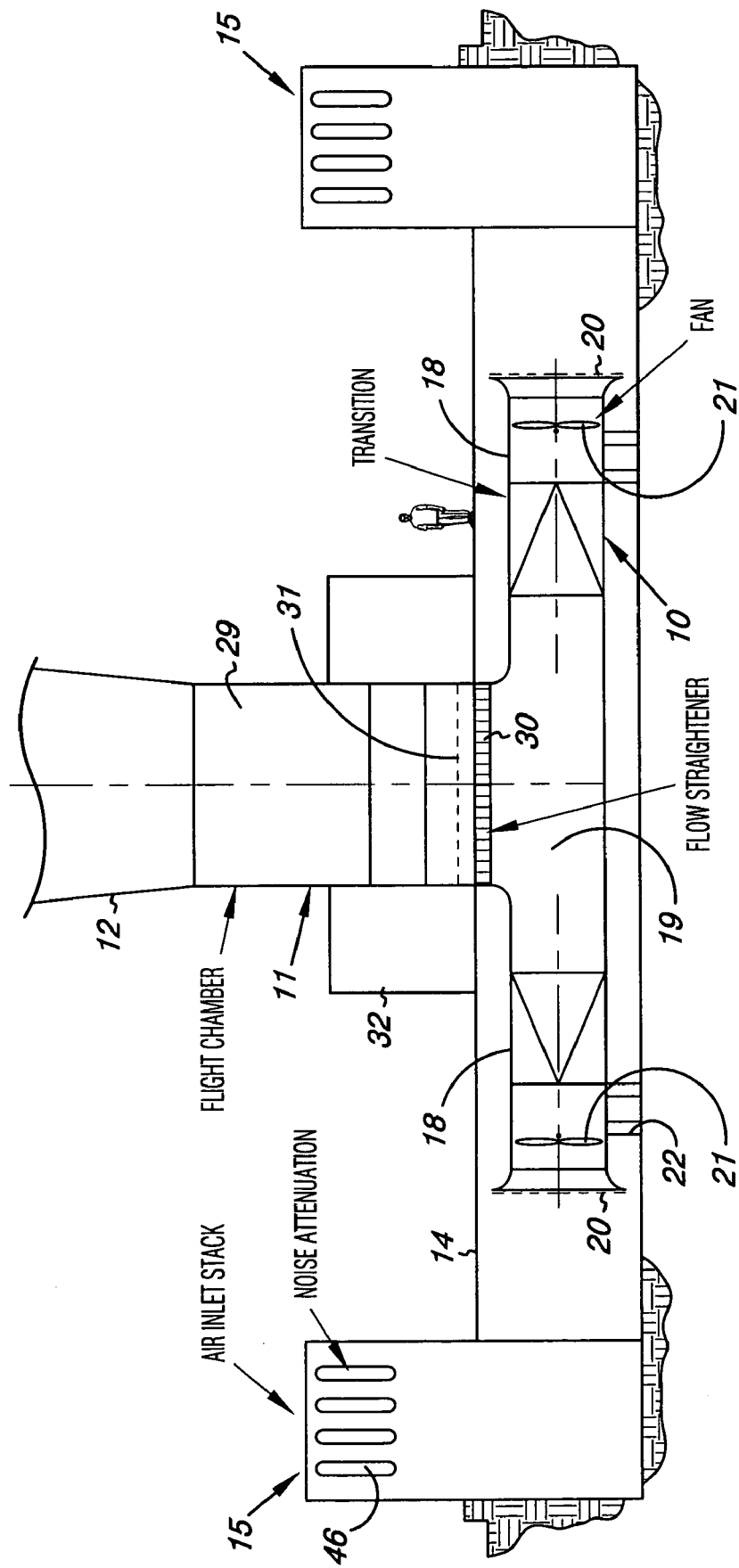
FIG. 4 is a side elevational view, partially in section, of a free fall simulator in accordance with the present invention.
Figure 5:
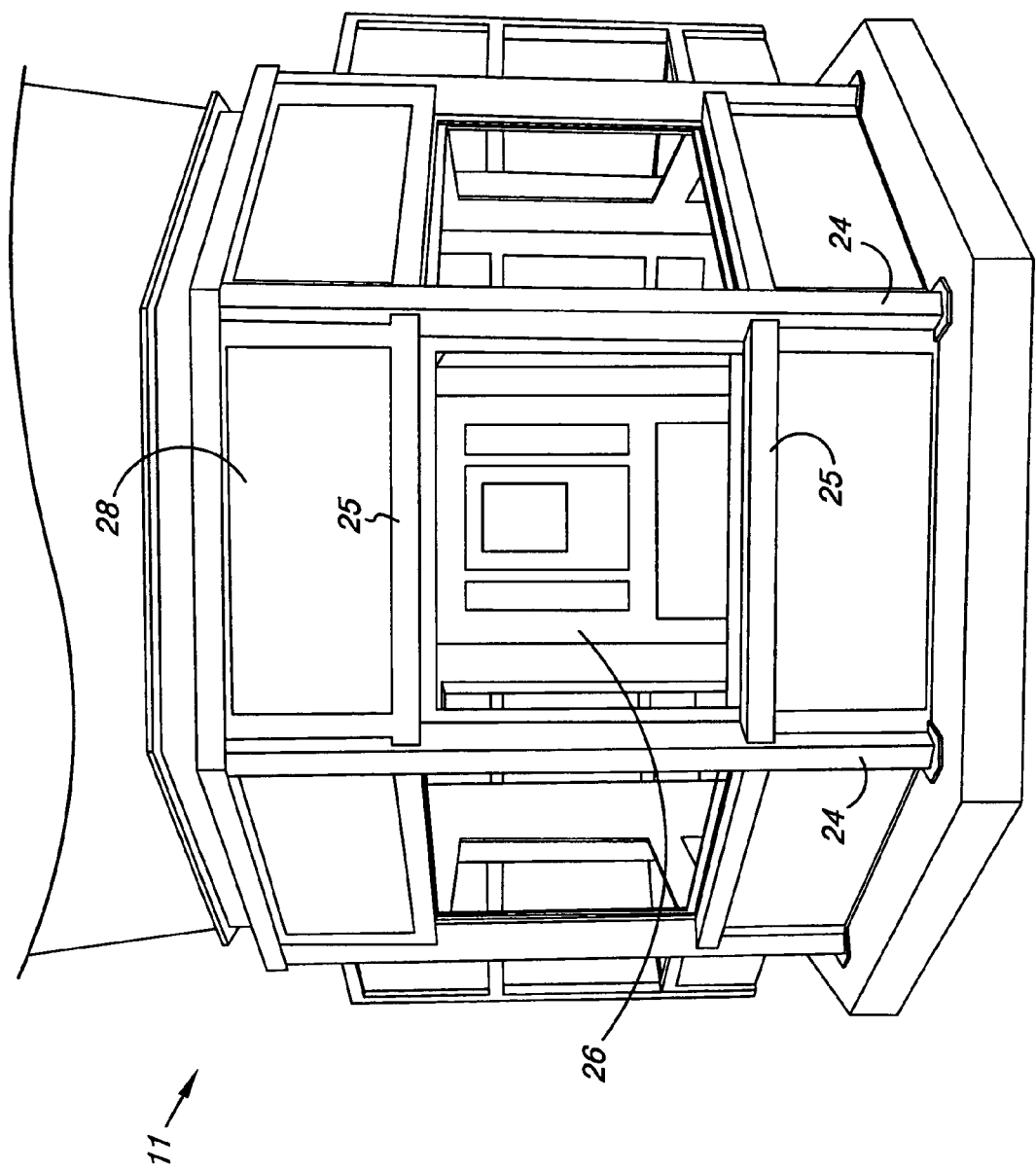
FIG. 5 is an isometric view of the flight chamber section of the free fall simulator of the present invention.

Any number of air intake ducts 18 can be provided for the free fall simulator in accordance with the present invention. Preferably, however, the simulator is provided with a plurality (two or more) of such ducts. As shown in FIGS. 3 and 4, the outer ends of each of the air intake ducts 18 are provided with appropriate support members 22.

The flight chamber 11 is shown in each of FIGS. 1–5. The flight chamber 11 includes a plurality of vertical wall struts 24, a plurality of horizontal braces 25 and a plurality of windows 26 or solid panels 28. The specific structure of the flight chamber 11 can be of conventional design known to those skilled in the art, provided it is sufficient to define an enclosed central area 29 (FIG. 4).

As shown best in FIG. 4, the flight chamber 11 is provided directly above, and is in communication with, the central air intake chamber 19. In the preferred embodiment, a flow straightener 30 is provided between the chamber 19 and the flight chamber 11. The flow straightener 30 conditions the air entering the flight chamber 11 by reducing its turbulence and providing substantially laminar flow within the chamber 11. A safety net 31 or the like is provided at the bottom or near the lower end of the chamber 11 between the chamber 11 and the flow straightener 30. The flow straightener 30 may be of any structure known in the art, but preferably is a honeycomb-type structure.

If desired, the free fall simulator structure of the present invention may be provided with a plurality of auxiliary rooms or facilities 32 for use as a control room, an entrance/exit area for users to enter and exit the flight chamber 11, a preparation room and/or a viewing chamber. The system for entering and exiting the flight chamber will be more fully discussed below with respect to FIGS. 11–17

As shown best in FIG. 3, the flight chamber 11 and the entire central portion of the free fall simulator is supported by a base 34 with a plurality of support legs 35. The flight chamber 11 is also preferably provided with a plurality of angled struts or braces 36 as shown in FIG. 1. These struts or braces 36 extend from the top of the canopy 14 to points near the upper end of the flight chamber 11. The vertical column 12 is preferably supported by a plurality of wires or cables 38 extending between a portion of the column 12 and the noise attenuation stacks 15.

The noise attenuation means of the free fall simulator of the present invention includes the canopy 14, the plurality of stacks 15 and the wall sections 16. The noise attenuation canopy 14 is positioned above the fan means 10 and below the flight chamber 11 and extends radially outwardly from near the base of the flight chamber 11 as shown. The canopy 14 can be constructed of a single, monolithic structure or can be constructed of a plurality of panels which are connected to one another. The canopy 14 is preferably substantially horizontally disposed, although it can be positioned at an angle or slope downwardly toward its outer edge if desired. The canopy is preferably constructed of reinforced concrete or any other material which has noise attenuation capability and is sufficient to support the contemplated user traffic to and from the flight chamber 11 and the auxiliary rooms 32

The outer peripheral or circumferential edge of the canopy 14 is joined with a plurality of noise attenuation stacks 15. Any number of stacks 15 may be provided. For example, in FIG. 1, six such stacks 15 are provided, in FIG. 2, four such stacks 15 are provided and in FIG. 3, eight such stacks 15 are provided. Although it is preferred that the number of stacks 15 conform to, and be the same as, the number of air inlet ducts 18 and fan members 21, this does not necessarily need to be the case. For example, the number of stacks 15 can exceed the number of air inlet ducts 18 or may be less than the number of air inlet ducts 18. As shown, each of the stacks 15 has a lower end 39 which is supported on a surface substantially the same as the surface upon which the air duct supports 22 are supported and an upper end 40 which extends above the canopy 14. Each stack 15 also includes an inner wall 41, an outer wall 42 and a pair of side walls 44. Preferably, the amount of each stack 15 which extends above the canopy 14 should be at least about 10%, more preferably at least about 30%, and most preferably at least about 60% of the distance between the canopy and the bottom 39 of the stack 15. In the most preferred embodiment as shown in FIGS. 1–4, the stack 15 extends above the canopy 14 at least the same distance as it extends below the canopy 14.

Figure 6:
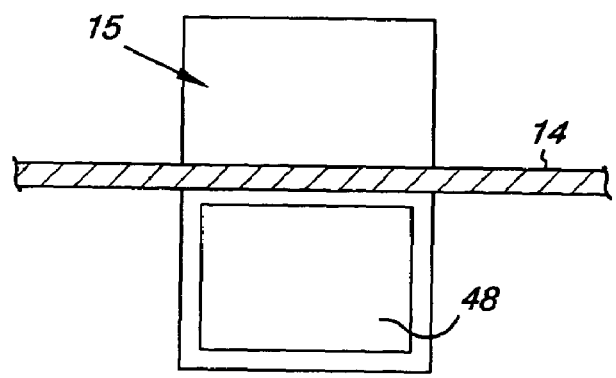
FIG. 6 is an elevational view of a noise attenuation stack as viewed from the inside of the noise attenuation housing.
Figure 7:
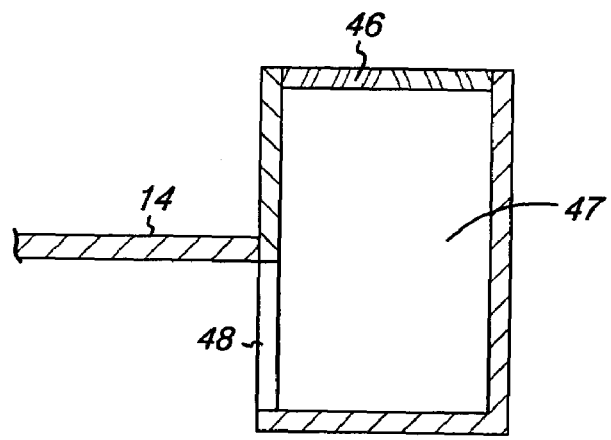
FIG. 7 is a view, partially in section, of a noise attenuation stack as viewed along the section line 7—7 of FIG. 1
Figure 8:
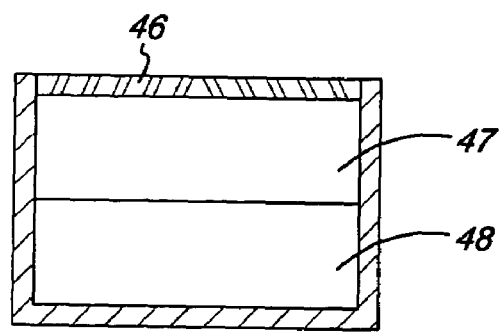
FIG. 8 is a view, partially in section, of a noise attenuation stack as viewed along the section line 8—8 of FIG. 1.

As shown best in FIGS. 6–8, each of the stacks 15 is provided with an air intake opening 45 on the portion of the inner wall 41 below the canopy 14. This opening 41 is connected with the interior 47 of the stack 15 which in turn is in communication with the inlet openings or noise attenuation baffles 46. In the preferred embodiment, the noise attenuation baffles 46 are shown as provided on the top surface of the stack 15.

These baffles 46 are generally elongated openings in the upper end of the stacks 15. Preferably the baffles 46 extend radially from the flight chamber axis and generally parallel to the axes of the inlet ducts as shown in the FIGS. 1, 2 and 3; however, they may extend laterally or at any other angle relative to the inlet ducts. The baffles 46 may be of any size that attenuates the noise level to the extent desired. As viewed from the top of a stack 15, the stack dimensions will vary depending on the airflow needed in the flight chamber, and the number of air inlet ducts 18 or stacks 15. The openings for the baffles will vary in size to meet the noise attenuation and pressure drop requirements. The width of the baffles may vary from several inches to a foot or more and the length and the depth of the baffles may vary from several inches to several feet or more. In some embodiments, the baffles 46 may be eliminated. In such a structure, the stacks 15 have a substantially open top. Preferably at least 50% of the stack top is provided with baffles 46 or open areas.

Accordingly, the number of noise attenuation stacks 15, the sizes of the openings 48 (FIGS. 6–8) and the sizes, numbers and orientation of the noise attenuation baffles 46 are selected so that sufficient intake air is provided and sufficient noise attenuation is achieved through the baffles 46 and through the openings 48 of the stacks 15 collectively to support the air stream within the flight chamber 11.

Like the canopy 14, the stacks 15 can be constructed of reinforced concrete or any other noise attenuation material. The material must also be structurally sufficient to accommodate the stresses imposed by the air moving through the baffles 46 and the interior of the stacks 15.

As shown best in FIGS. 1 and 6, a plurality of walls or wall portions 16 are provided to substantially enclose the fan means 10 and in particular that portion of the free fall simulator below the flight chamber 11 and the canopy 14. As shown, these wall sections 16 join along their upper edges with the outer circumferential edge of the canopy 14 and along their side edges with the side walls 44 of adjacent noise attenuation stacks 15. These wall sections 16, like the canopy 14 and the stacks 15, may be constructed of a variety of materials such as reinforced concrete or any other noise attenuation material. If desired, one or more of the wall sections 16 may be provided with a door or other entrance/exit means 51 as shown in FIG. 1.

Figure 2:
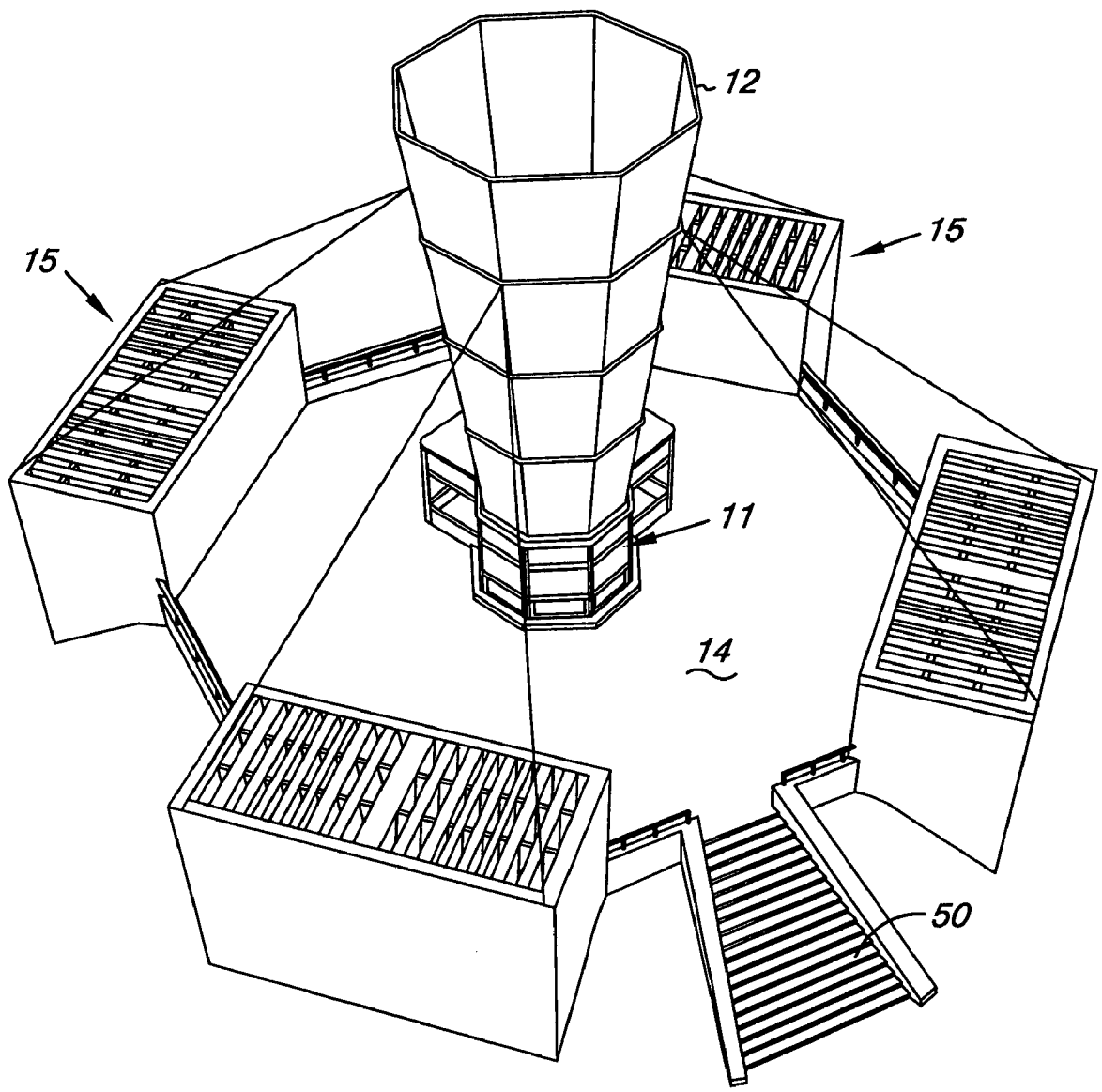
FIG. 2 is an isometric view of a further embodiment of a free fall simulator in accordance with the present invention.

In one embodiment of the free fall simulator in accordance with the present invention, as shown in FIGS. 1, 2 and 3, the simulator and the stacks 15 are supported at approximately ground level. In such embodiment, the wall sections 16 extend above the ground as shown. It is contemplated, however, that with the structure of the present invention, the free fall simulator and the stacks 15 can be supported below ground level as shown in FIG. 4. In such embodiment, the wall sections 16 would be positioned below the ground level and the canopy 14 would be approximately at or slightly above or below ground level. In the embodiment of FIG. 4, as shown, the upper ends 40 of the stacks 15 would extend above the ground level and the intake air ducts 18 would be supported either wholly or partially below ground level. In the embodiment of FIGS. 1, 2 and 3, a stairway 50 or other means may be provided to enable the user to access the top surface of the canopy 14 for entry to or exit from the flight chamber 11.

Although an embodiment in which a canopy 14 and wall sections 16 are provided is preferred, one or both of these elements could be eliminated. For example, some noise attenuation can be achieved by connecting the outer ends 20 of the inlet ducts 18 to the openings 48 in the stacks 15. In this embodiment, the simulator would be provided with a plurality of air inlet ducts 18 and a plurality of noise attenuation stacks 15 connected thereto. Each of the stacks 15 is provided with air inlet openings in the form of baffles 46 or an open top.

Figure 9:
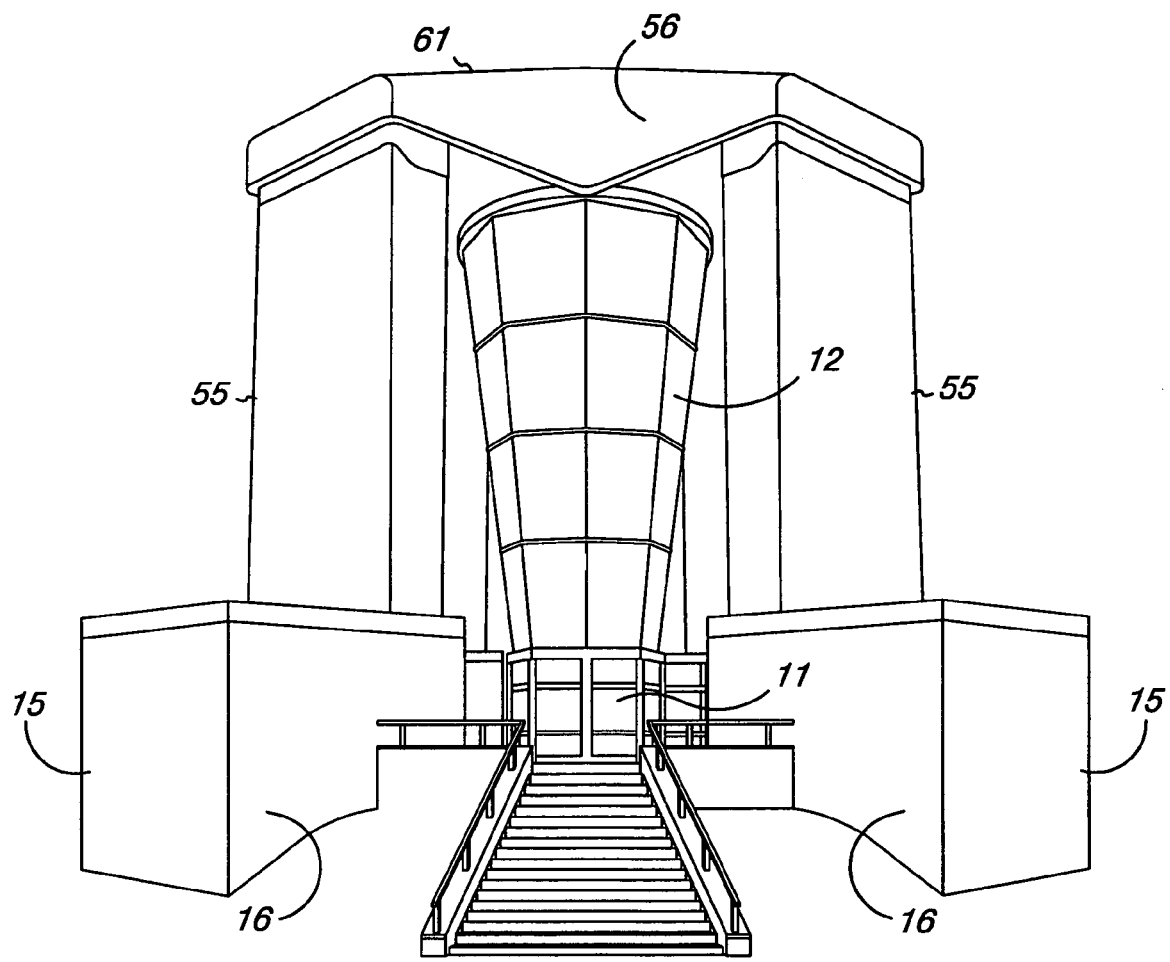
FIG. 9 is an isometric view of a closed circuit free fall simulator.
Figure 10:
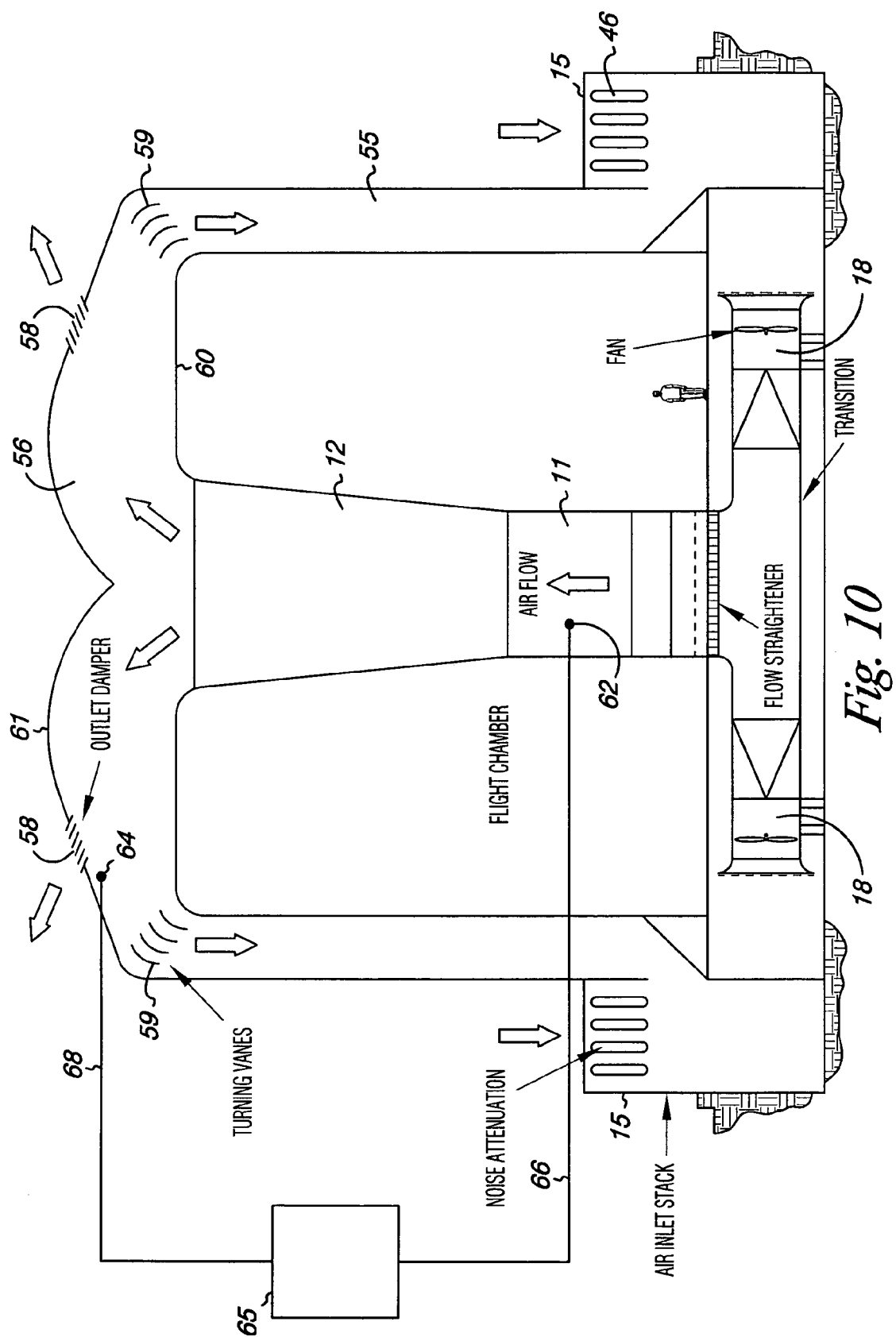
FIG. 10 is a sectional view of a closed circuit free fall simulator in accordance with the present invention.

FIGS. 9 and 10 show isometric and sectional views, respectively, of a recirculating or closed circuit free fall simulator. Whereas the free fall simulator embodiments shown in FIGS. 1–4 are open systems in which incoming air enters the flight chamber 11 through the noise attenuation stacks 15 and exhaust air leaves the system through the upper end of the column 12, a recirculating or closed system includes an air recirculating structure in which some or all of the exhaust air can be recirculated and rerouted through the flight chamber Specifically, the closed system in accordance with the present invention includes many of the same elements and features of the open circuit simulator shown and described with respect to FIGS. 1–4. For example, the closed circuit simulator of FIGS. 9 and 10 includes a flight chamber 11, a vertical chamber or column 12 and a plurality of fan means 18 for providing sufficient air flow in the flight chamber 11 to support a user. The closed circuit configuration of FIGS. 9 and 10 also preferably include noise attenuation means in the form of the canopy 14, the plurality of noise attenuation stacks 15 with noise attenuation baffles or openings 46 at their upper ends and a plurality of wall sections 16 (FIG. 9) joined with the outer peripheral edge of the canopy 14 and adjacent noise attenuation stacks 15.

Additionally, the closed circuit embodiment of FIGS. 9 and 10 further include one or more substantially vertical recirculation columns or chambers 55 and a recirculation hood 56. As shown, the recirculation hood 56 comprises a substantially closed chamber above the exhaust column 12 and is defined by an inner or lower wall 60 and an outer or upper wall 61. The hood 56 is in communication with the open top of the column 12 as well as the upper ends of each of the recirculation columns 55. The lower or bottom ends of the recirculation columns 55 are in communication with the noise attenuation stacks 15. With this structure, exhaust air from the flight chamber 11 and the column 12 can be directed back to the inlet fans 18 and thus the flight chamber 11 via the hood 56, the recirculation columns 55 and the stacks 15. To reduce turbulence, the juncture between the hood 56 and the recirculating columns 55 may be provided with turning vanes 59 if desired.

The top or outer wall 61 of the hood 56 is also preferably provided with a plurality of louvers or outlet dampers 58 which are capable of being moved between a closed position to preclude air flow through the louvers 58, a fully open position in which air can freely flow through the louvers 58 and any position between a fully closed and fully open position. The louvers or dampers 58 can be of any conventional structure for controlling the movement of air therethrough.

When the louvers 58 are fully closed, all or substantially all of the air which exits from the top of the column 12 is recycled back through the recirculating columns 55 into the upper ends of the stacks 15 and in through the fans 18 for recirculation through the flight chamber 11. To the extent the louvers 58 are open, a portion of the exhaust air is allowed to escape through the louvers 58. In this case, only a portion of the exhaust air is recycled through the recirculation columns 55. In that event, the makeup or additional air needed for flow through the flight chamber 11 is drawn in through the open portion of the stack 15 through the baffles 46.

One problem or issue which commonly is encountered with recirculating or closed circuit systems is the buildup of the air temperature in the flight chamber 11. Because of heat generated from the friction of the recirculating air and the operation of the fan means 18, the air temperature within the system will rise during operation. Depending upon the ambient outside temperature, the air temperature in the flight chamber 11 can rise to the point where it is undesirably warm. Thus, although a recirculating or closed system assists in heating the air in a flight chamber in northern climates or other areas where the outside temperature is lower than desired, a fully closed system will ultimately cause the temperature within the flight chamber to be too warm.

With the louvers 58 in the wall 61 of the hood 56, the amount of recirculating air can be controlled. Thus, the temperature of the air within the flight chamber 11 can be controlled. In accordance with the present invention, this is accomplished by controlling the amount of recirculating air (make up air) and thus the amount of ambient temperature which passes through the flight chamber 11.

Associated with the louvers 58 is a temperature control mechanism which includes a temperature probe 62 located in the flight chamber, an open/close mechanism 64 connected with the louvers 58, a control box 65 with appropriate control circuitry and leads 66 and 68. The lead 66 provides flight chamber temperature information from the temperature probe 62 to the control 65 and the lead 68 provides open/closure signals from the control 65 to the mechanism 64. With such a system, the amount of recirculation air, and thus the amount of make up air, can be controlled. This in turn controls the temperature of the air within the flight chamber 11.

Figure 11:
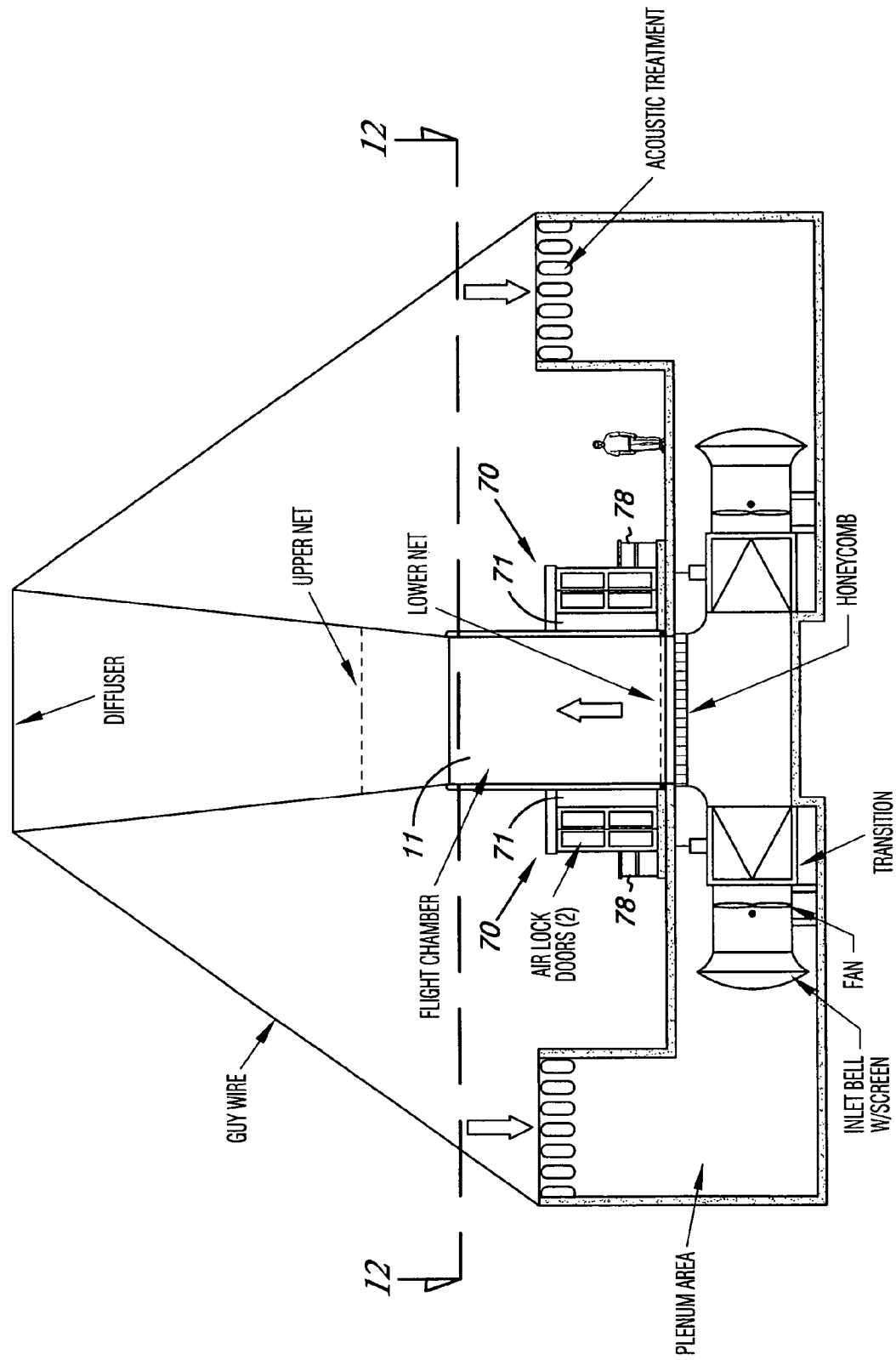
FIG. 11 is a side view, partially in section, of a free fall simulator showing an air lock door system for entrance into the flight chamber.
Figure 12:
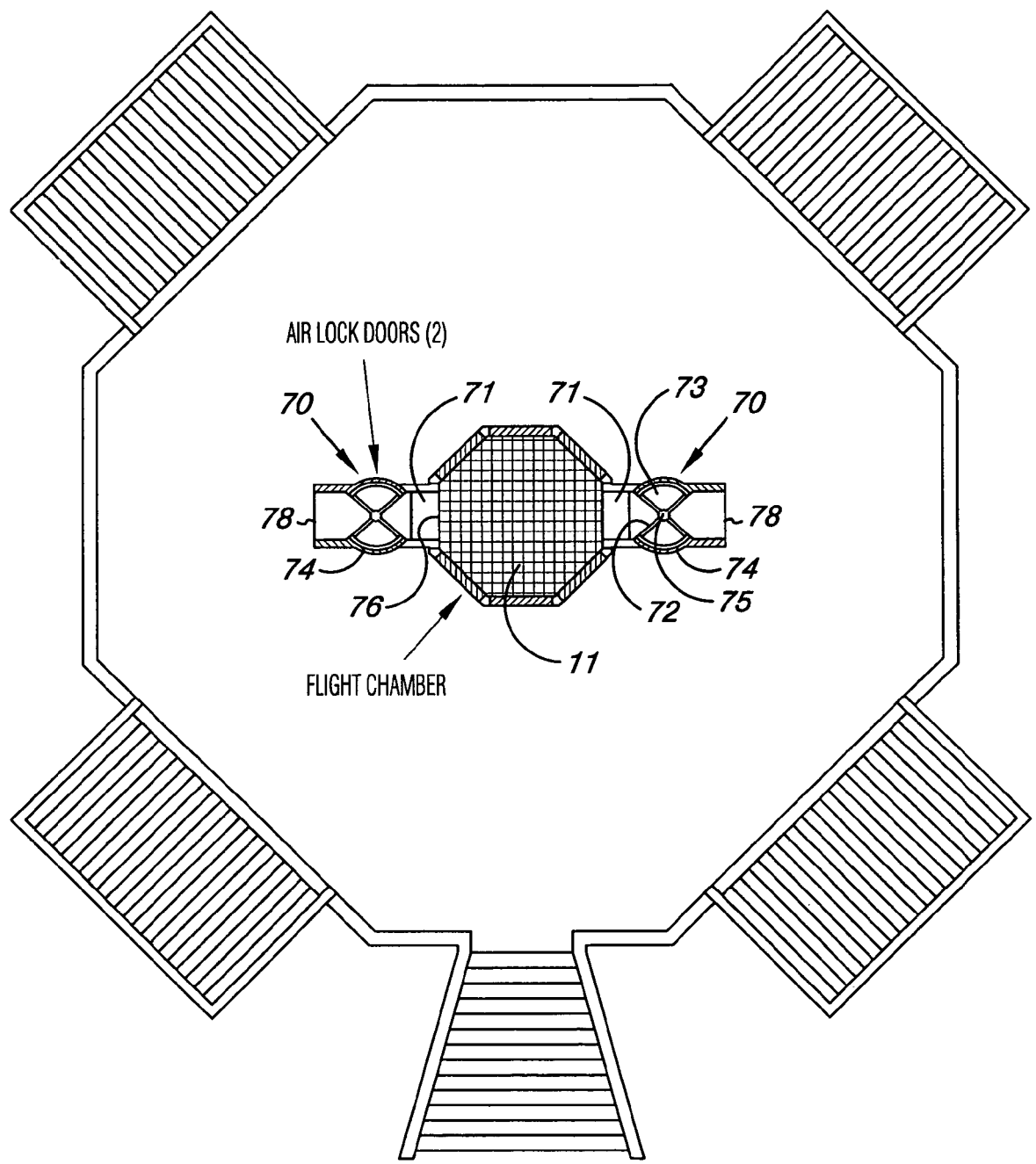
FIG. 12 is a view, partially in section, as viewed along the section line 12—12 of FIG. 11.
Figure 13:
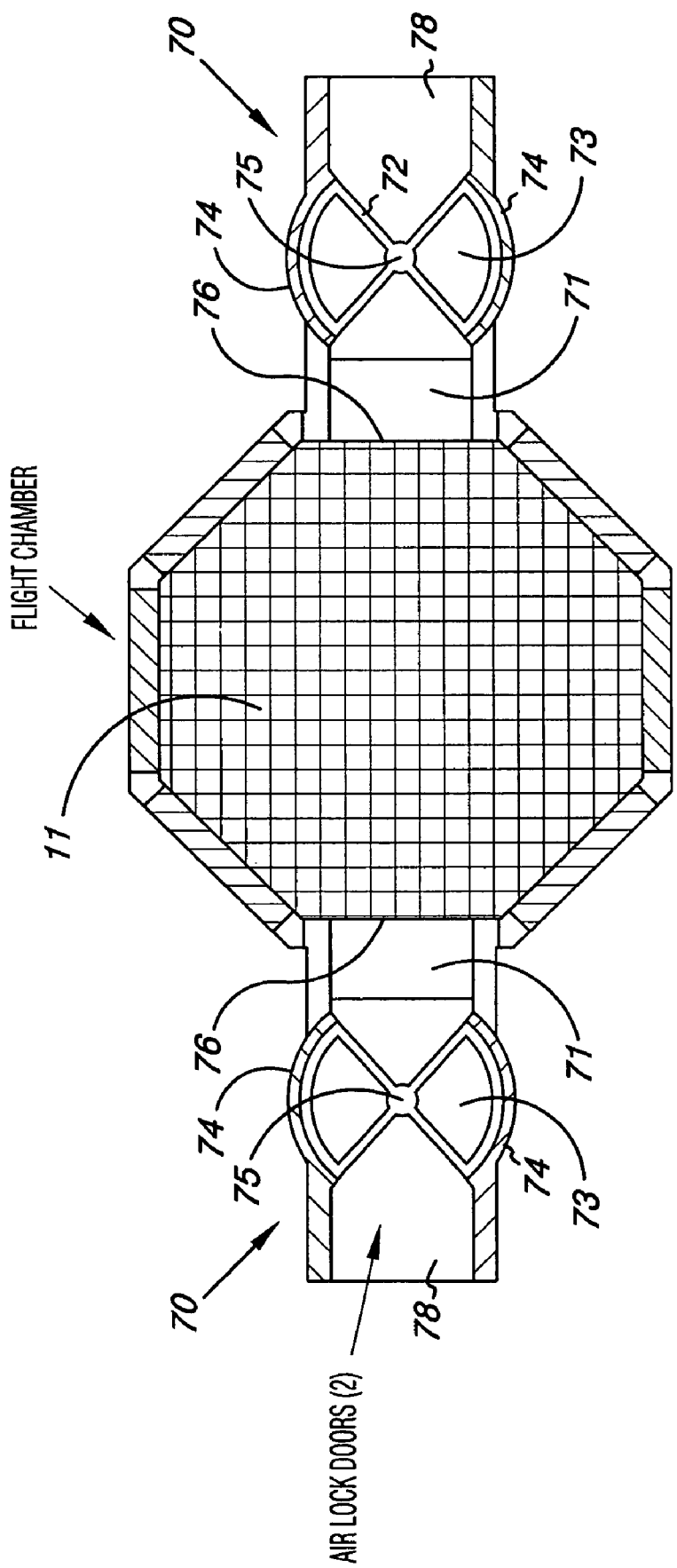
FIG. 13 is an enlarged view of the revolving door system of FIGS. 11 and 12.

Reference is next made to FIGS. 11–17 disclosing various ingress/egress systems for entering and exiting the flight chamber. FIGS. 11, 12 and 13 show an ingress/egress system which includes a pair of revolving doors 70,70 on opposite sides of the flight chamber 11. These revolving doors 70,70 are air lock revolving doors which include a plurality of vanes or door panels 72 having one side edge rotating around a center rotation point 75 and an outer side edge engaging a seal surface of the curved wall portion 74 during at least a portion of the revolution of the panels 72. In a preferred embodiment, the wall portion 74 has a circular configuration with a radial center at the point 75 and the outer side edges of the rotating vanes 72 are provided with elongated seal members to create a substantially sealing engagement with the wall portion 74 during revolution. Preferably, the top and bottom edges of the rotating vanes or door panels 72 are also provided with seal members for correspondingly engaging a floor surface portion and a ceiling surface portion in substantially sealing relationship. The distance between the outer edges of adjacent vanes 72 and the lateral dimension of the wall portion 74 are such that during revolution of the door 70, at least one of the vanes is always in sealing relationship with the wall portion 74. This results in the formation of a transition chamber 73 between the wall portion 74 and adjacent vanes 72 as the door revolves. This transition chamber 73 enables a sufficient dynamic pressure and air flow within the flight to be maintained while users are entering or exiting from the flight chamber 11 or an area adjacent thereto.

In the embodiment of FIGS. 11–13, a short entrance area 71 is provided between each of the revolving doors 70,70 and the flight chamber 11. In the embodiment of FIGS. 11–13, the entrance areas 71,71 communicate with the flight chamber 11 through openings 76 (without doors) which communicate directly with the flight chamber 11. The areas 71,71 shown in FIGS. 11–13 are only large enough to allow a user to exit from the revolving doors 70,70 and enter the flight chamber 11. If desired, however, the areas 71,71 can be expanded to accommodate several users, including instructors or the like and can extend circumferentially around a portion of the flight chamber 11. It is also possible to extend the areas 71,71 circumferentially so that they are joined to one another.

A short entrance way or threshold 78 is provided adjacent the outer end of each of the revolving doors 70,70 to provide a passage for the user to enter and exit the revolving doors 70,70.

The embodiment of FIGS. 11–13 shows revolving doors 70,70 with four extending vanes or door panels 72. However, any number of vanes or door panels may be utilized as long as they maintain the doors 70,70 in a substantially sealed relationship between the flight chamber 11 and atmospheric pressure during revolution. Accordingly, the revolving doors 70,70 require at least two vanes.

Figure 14:
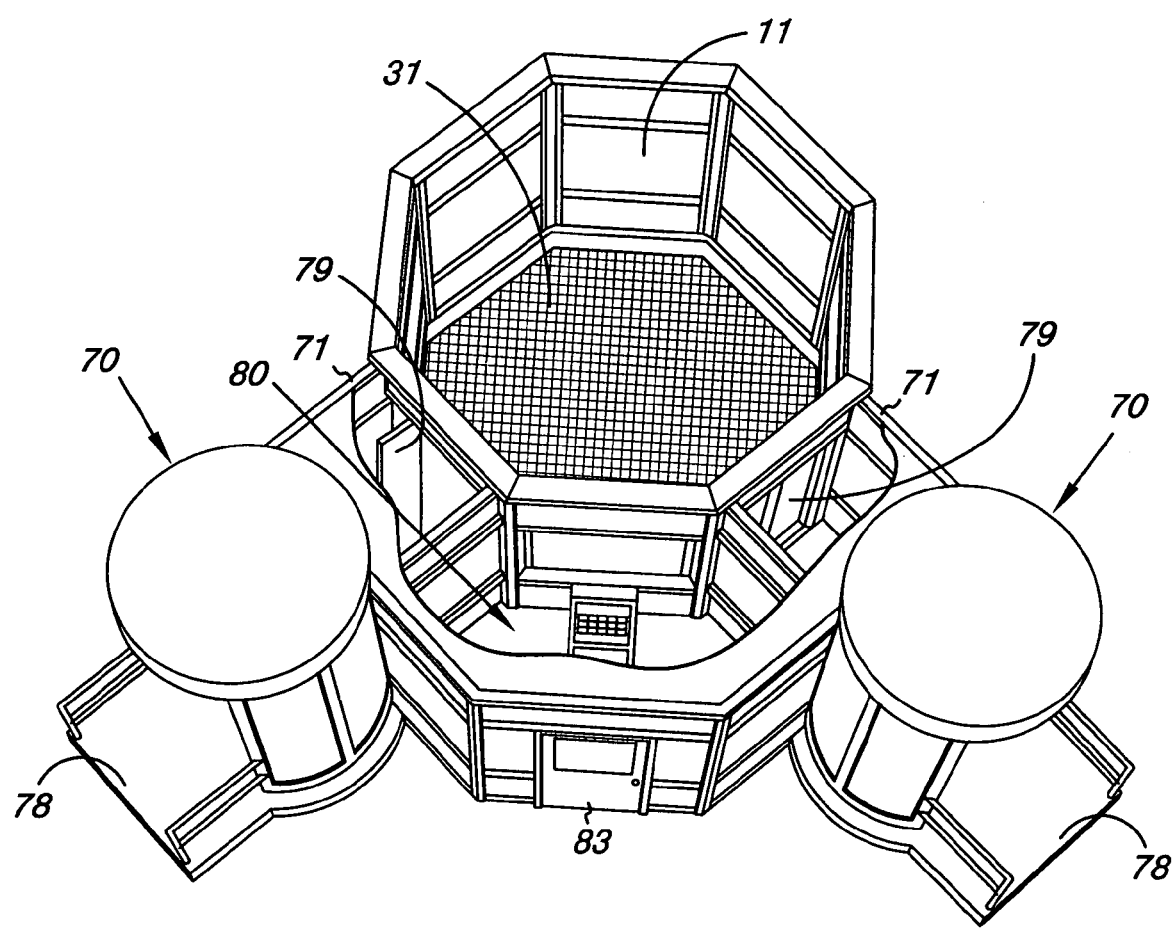
FIG. 14 is a fragmentary isometric view showing a portion of the flight chamber and a modified air lock door system for entrance into and exit from the flight chamber.

Further, although the openings 76,76 between the areas 71,71 and the flight chamber 11 are shown as being open (without doors), doors can be provided, if desired as shown in FIG. 14 and as described below. Still further, although the doors 70,70 are shown in FIGS. 11–13 as being exactly opposite to one another, they can be provided at any one of a variety of positions such as that shown in FIG. 14 in which the doors are angularly spaced about 90° from one another.

With reference to FIG. 14, a pair of revolving air lock doors 70,70 are provided at approximately 90° relative to one another. Similar to the embodiment of FIGS. 11–13, an entrance area 71,71 is provided between the doors 70,70 and the flight chamber 11 to allow the user to exit the revolving door 70 and enter the flight chamber 11 or exit the flight chamber 11 and enter the revolving door 70. Unlike the embodiment of FIGS. 11–13, the embodiment of FIG. 14 includes a door 79 between each of the entrance areas 71,71 and the flight chamber 11. In the preferred embodiment, these doors 79 comprise a pair of swinging door panels which preferably swing outwardly, away from the flight chamber 11. Thus, for a user to enter the flight chamber from the entrance area 71,71, the doors are pulled outwardly toward the user before the user enters the flight chamber 11. When exiting the flight chamber 11, the user merely pushes the swinging doors 79 open.

In the embodiment of FIG. 14, a control room 80 is provided between the entrance areas 71,71. However, if the control room 80 includes an air lock door 83 so that the control room is substantially air tight, the areas 71,71 can be joined with and open to the room 80.

Figure 15:
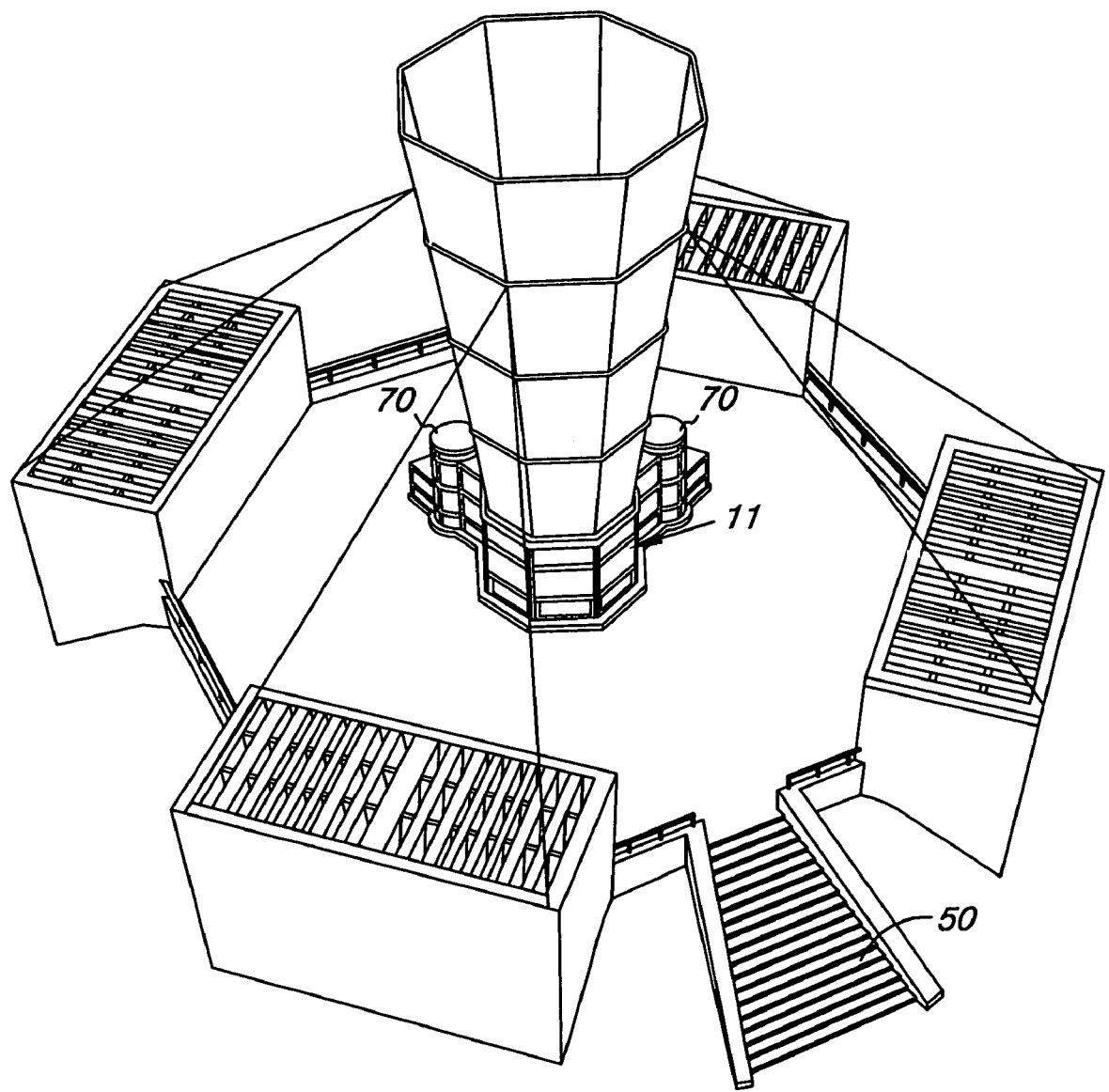
FIG. 15 is an isometric view of the entire free fall simulator system incorporating the ingress/egress system shown in FIG. 13.

FIG. 15 is an isometric view showing the entirety of a free fall simulator utilizing the ingress/egress system shown in FIG. 13 with the pair of revolving doors 70,70 and the flight chamber 11.

Figure 16:
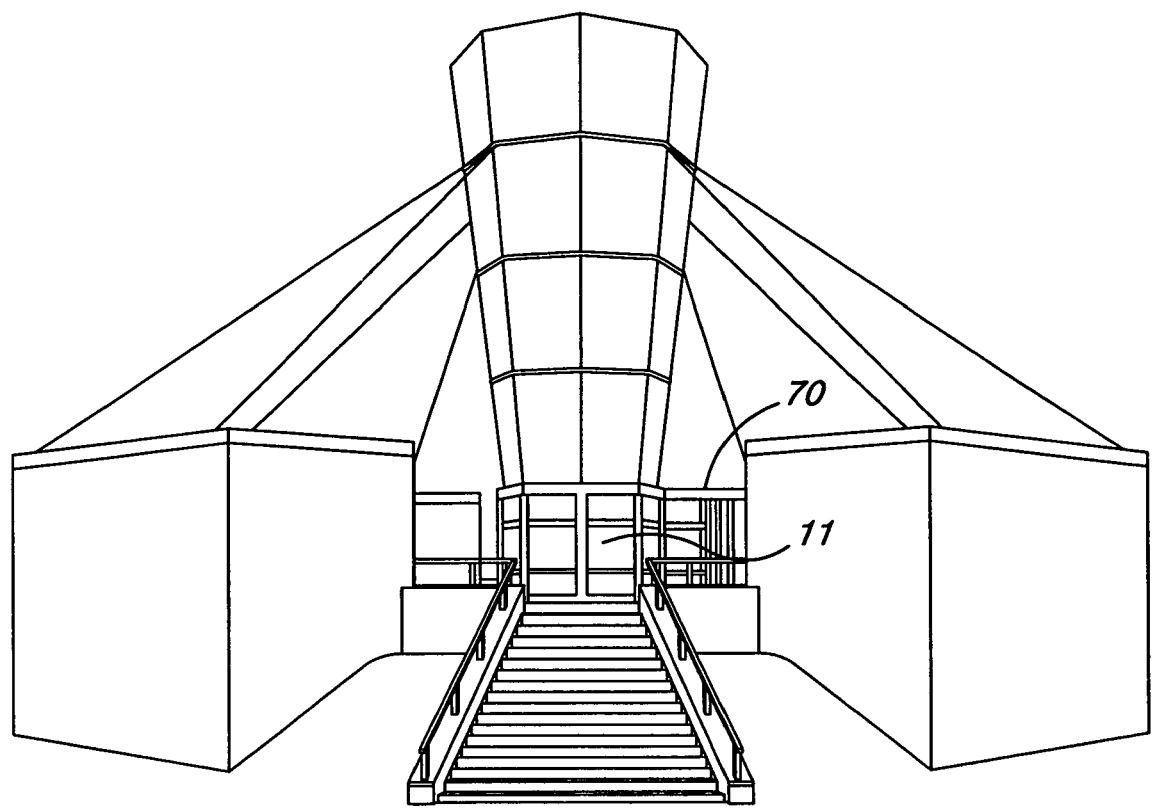
FIG. 16 is a further isometric view of the free fall simulator shown in FIG. 14.

FIG. 16 is an isometric view of the free fall simulator shown in FIG. 14, except from a different viewpoint, showing one of the revolving doors 70 and the flight chamber 11.

Figure 17:
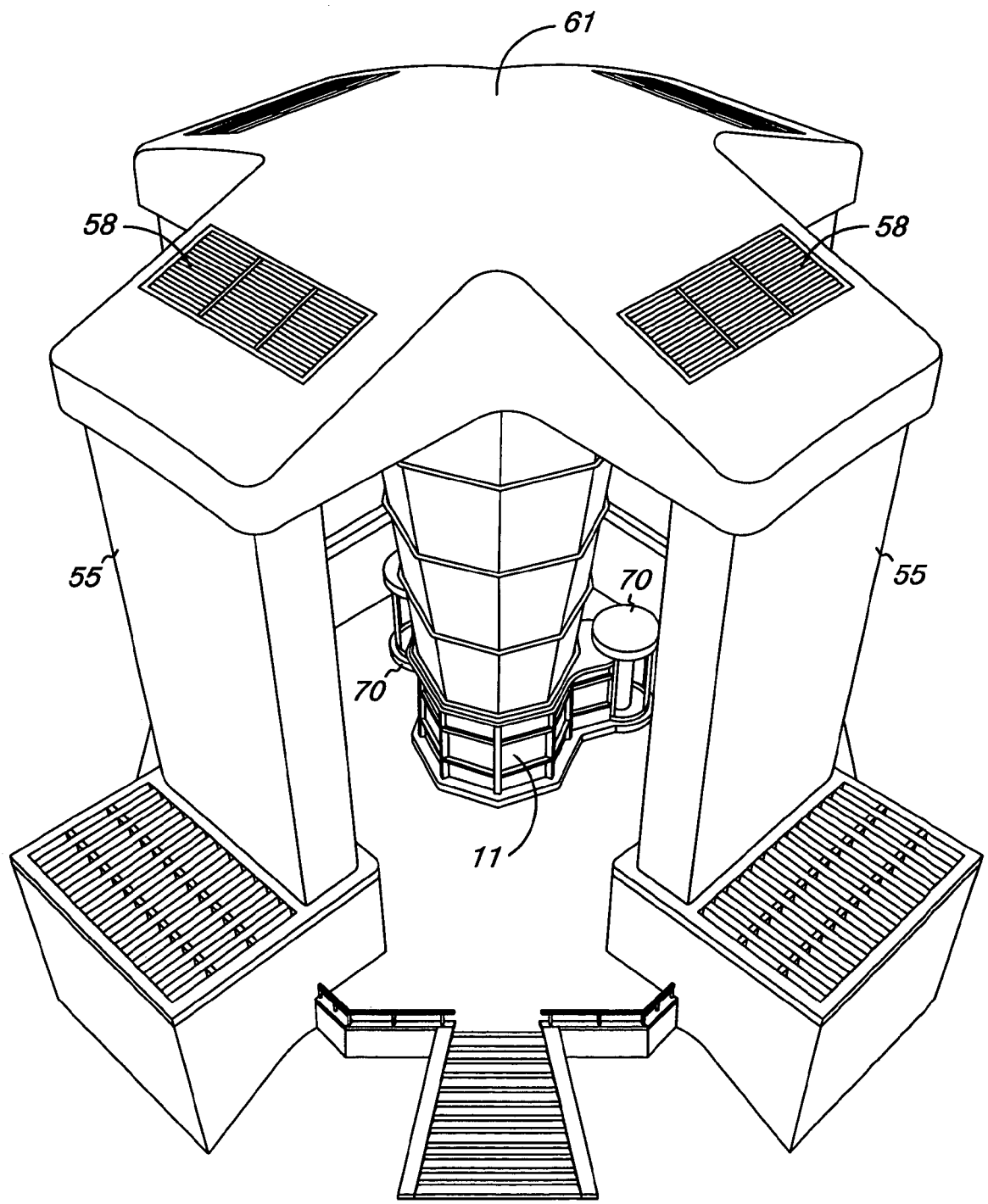
FIG. 17 is an isometric view of a further embodiment of the free fall simulator in accordance with the present invention.

FIG. 17 is an isometric view of a partially recirculating or closed circuit system utilizing a pair of revolving doors 70,70 as the ingress/egress means for the flight chamber 11. Similar to the embodiment of FIG. 10, this system includes a top or outer wall 61 and a plurality of vertical chambers 55 for recirculating at least a portion of the flight chamber air. As shown and described above with respect to FIG. 10, the top wall 61 includes a plurality of louvers or outlet dampers 58 for controlling the extent to which air exiting the flight chamber 11 is recirculated through the columns 55.

Although the preferred ingress/egress system in accordance with the present invention includes an air lock door system in the form of a revolving door as shown in FIGS. 11–17, it is contemplated that other air lock door systems could also be used without deviating from the concept of the invention, namely, allowing ingress and egress from the flight chamber and surrounding adjacent areas without reducing, or without the necessity of reducing, the flight chamber fan speed.

For example, an alternate air lock door system could include a pair of air lock doors defining a transition chamber between them. The pair of doors would include an outer door adjacent to the ambient atmosphere and an inner door adjacent to the flight chamber or an area adjacent to the flight chamber. Such pair of air lock doors could be hinged, could be unhinged or could be elevator-type doors, among others. To enter the flight chamber or the surrounding area with this type of door system, one of the doors (the outer door) is opened and the users enter the transition chamber. After the outer door is closed, the inner door is opened to permit the users to enter the area surrounding the flight chamber or the flight chamber directly. The inner door may then be closed. To exit the flight chamber, or the area surrounding the flight chamber, the inner door is opened and the users enter the transition chamber. The inner door is then closed and the outer door is opened to allow the users to exit the transition chamber. Accordingly, with such a system, as well as the revolving door system described above and various other air lock door systems, the flight chamber can remain operational while users continue to enter and exit the system.

Having described the structural aspects of the ingress/egress system in accordance with the invention, the method or operational features of the invention can be described as follows.

First, a flight chamber is provided with sufficient air flow and dynamic pressure to support a user in the air flow stream against the force of gravity. Second, an air lock door system or ingress/egress system is provided which enables a user to enter or exit from the flight chamber or the surrounding area without significantly adversely affecting the air flow or dynamic pressure within the flight chamber. Such a system includes a transition zone or chamber between the flight chamber and the outside atmosphere. This transition zone or chamber may be formed by one or more revolving doors, a pair of doors accessible to the transition chamber or any one of a variety of other air lock door systems.

Third, the air flow generating means is activated to provide sufficient air flow to support a user against the force of gravity and fourth, such air flow is maintained at a level sufficient to support a user against the force of gravity during the ingress and egress of other users from the flight chamber or from the area surrounding the flight chamber.

Figure 18:
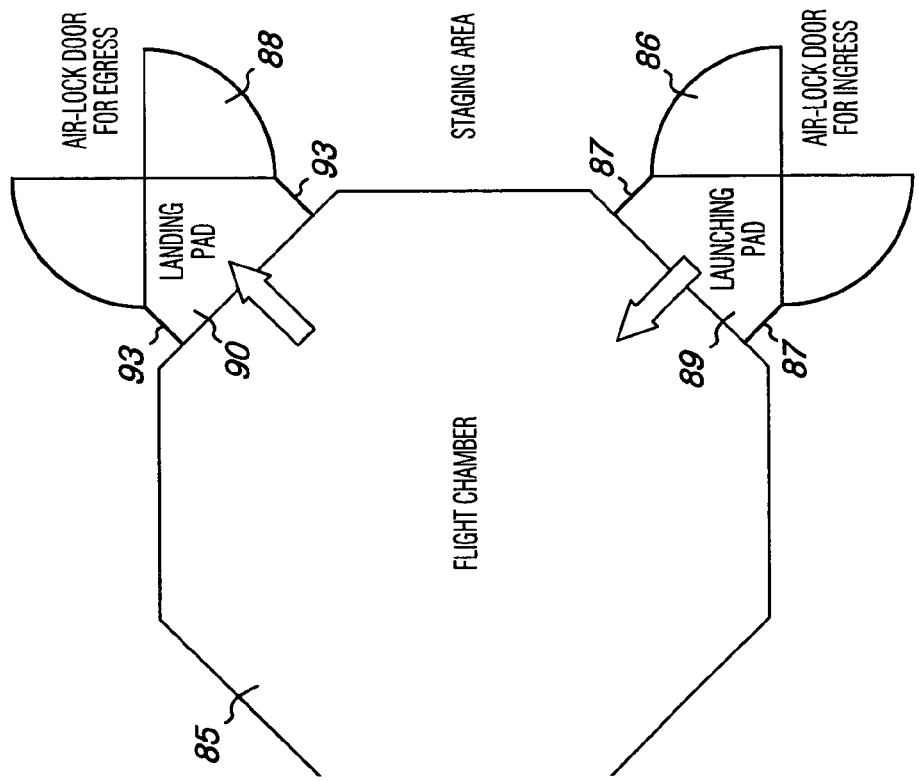
FIG. 18 is a plan view of an alternate flight chamber layout with airlock ingress and egress doors.

FIG. 18 is a plan view of a flight chamber configuration with an airlock ingress door in the form of the revolving door 86 and an airlock egress door in the form of the revolving door 88. The door 86 has an associated launching pad 89 between the flight chamber 85 and the door 86 to provide an area from which a user can enter the flight chamber. The door 88 has an associated landing pad 90 between the revolving door 88 and the flight chamber 85 to provide a launching area for a user leaving the flight chamber 85. Short wall sections 87, 87 and 93,93 between the doors 86,88 and the flight chamber 85 define the launching pad 90.

Figure 19:
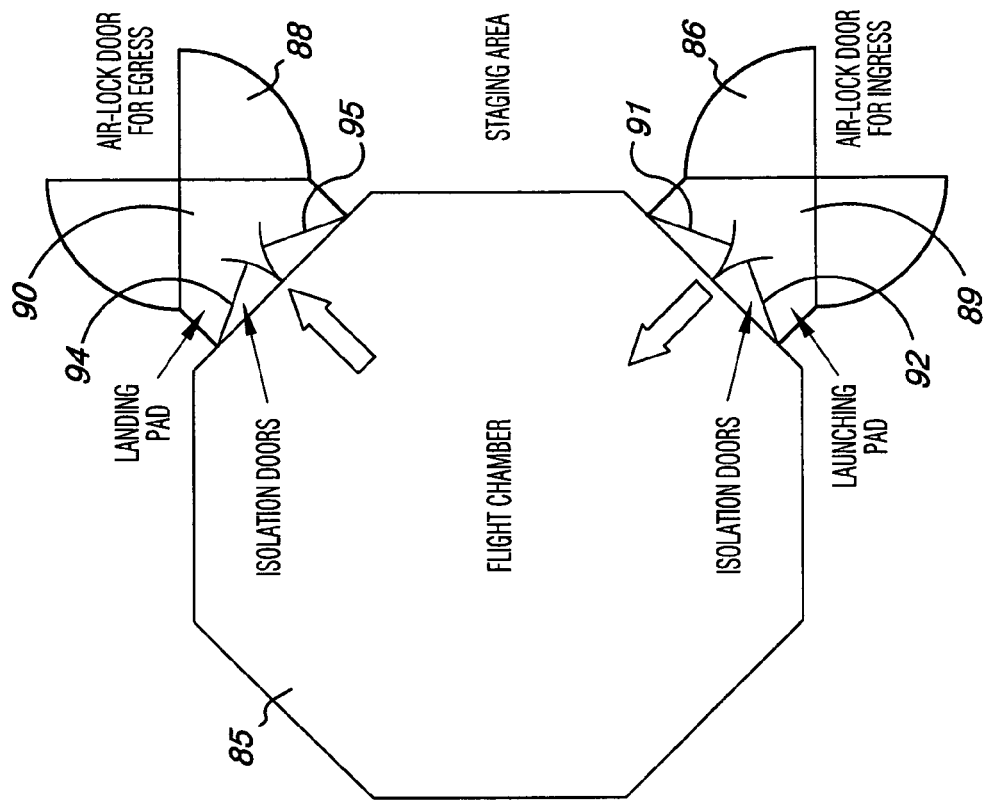
FIG. 19 is a plan view of a further embodiment of a flight chamber layout with airlock ingress and egress doors.

FIG. 19 is an embodiment similar to the embodiment of FIG. 18, except that it includes a pair of isolation doors 91 and 92 positioned between the launching pad 89 and the flight chamber 85 and a pair of isolation doors 94 and 95 positioned between the landing pad 90 and the flight chamber 85. These isolation doors 91,92 and 94,95 may be any kind of hinged doors. Preferably, they hinge inwardly relative to the launching pad 89 and the landing pad 90. These doors may be sealed, if desired.

Figure 20:
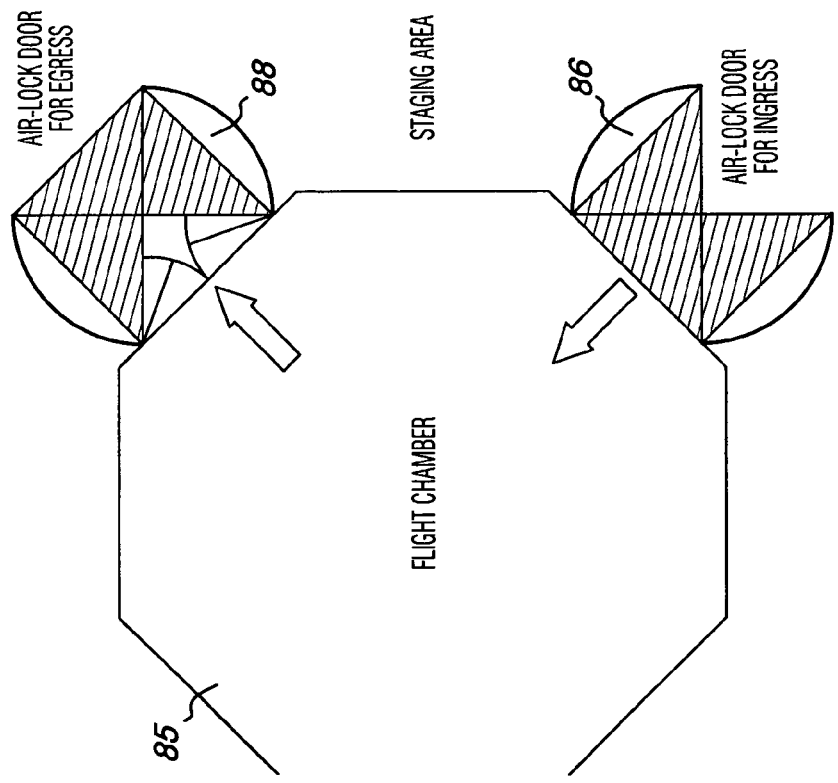
FIG. 20 is a plan view of a further embodiment of a flight chamber layout with airlock ingress and egress doors.

FIG. 20 is similar to the flight chamber configuration of FIG. 19, except that the revolving doors 86 and 88 are positioned immediately adjacent to the flight chamber 85. Thus, the short wall sections defining the launching pad 89 and the landing pad 90 of FIG. 19 have been eliminated from FIG. 20. Thus, users entering the flight chamber 85 or leaving the flight chamber 85 enter or leave from the open triangular area 96 of the revolving doors 86 and 88. In this particular embodiment, the remaining triangular areas of the revolving door are closed, although this is optional. Further, this particular embodiment may or may not include the isolation doors 91,92 and 94,95 shown in FIG. 19.

Figure 21:
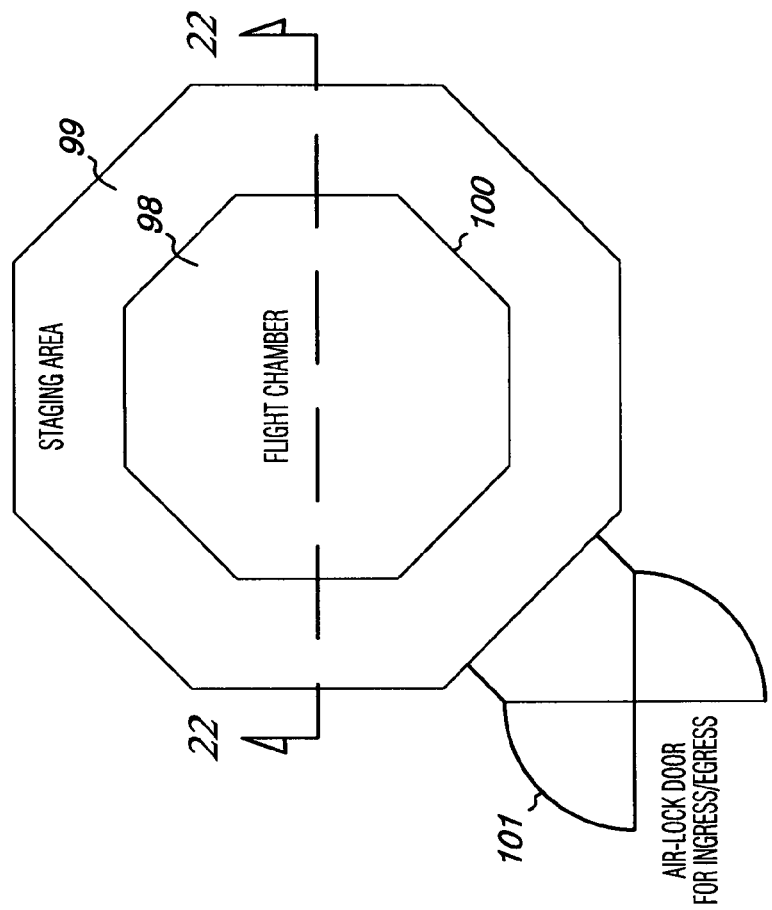
FIG. 21 is a plan view of a further embodiment of a flight chamber layout with an airlock ingress/egress door.
Figure 22:
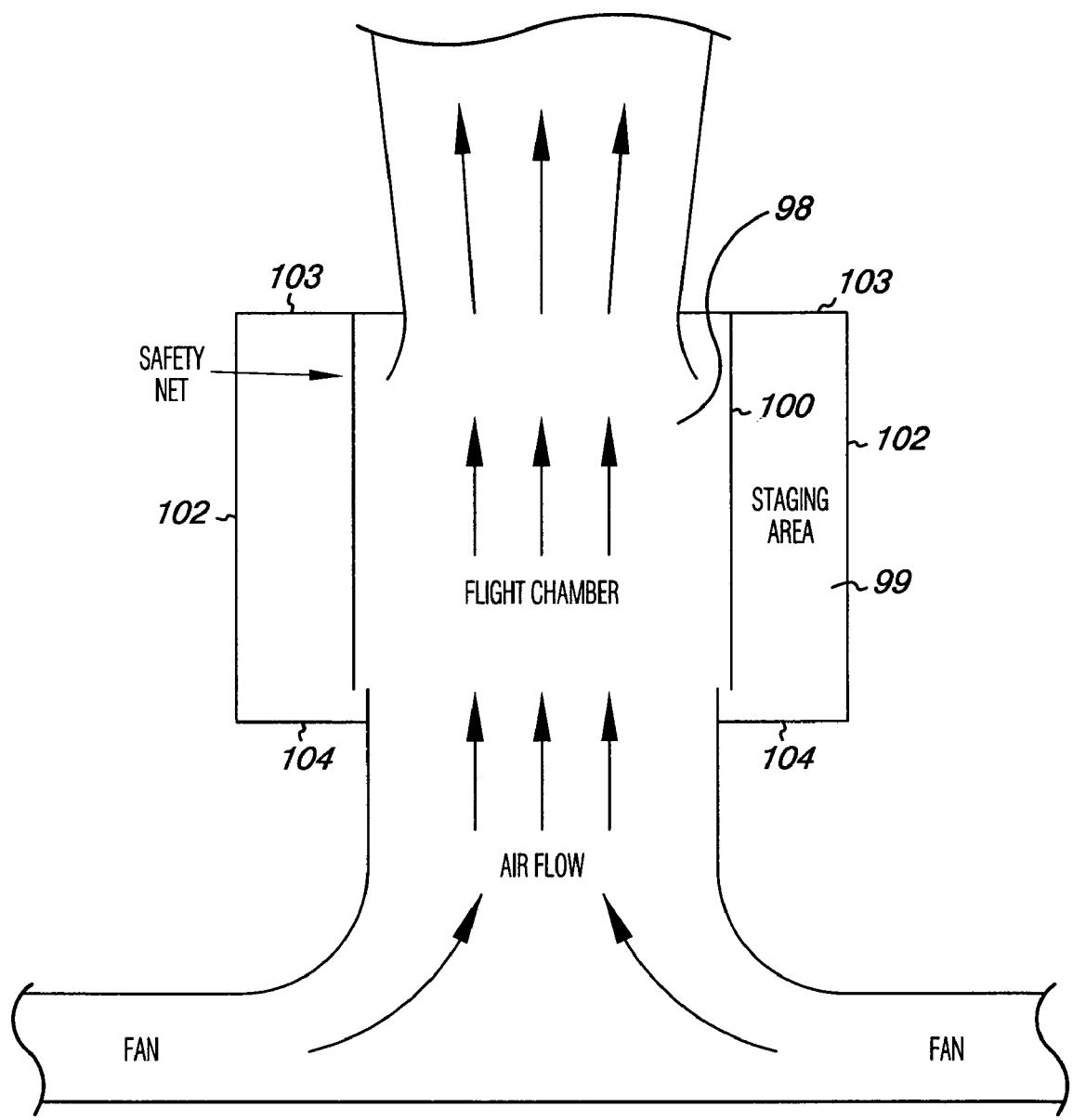
FIG. 22 is a sectional view of the flight chamber configuration of FIG. 21 as viewed along the section lines 22,22 of FIG. 21.

FIGS. 21 and 22 represent a still further embodiment of a flight chamber configuration. In these figures, the flight chamber 98 is surrounded by a staging area 99 as shown. Specifically, the staging area 99 extends around the entire periphery of the flight chamber 98 and is defined by wall 102, ceiling 103 and floor 104 sections. If desired, a safety net 100 may be hung between the flight chamber 98 and the staging area 99 to prevent users from falling out of the flight chamber during use. An airlock ingress/egress door in the form of the revolving door 101 provides ingress and egress access to the staging area 99.

Although the description of the preferred embodiment has been quite specific, it is contemplated that various modifications could be made without deviating from the spirit of the present invention. Accordingly, it is intended that the scope of the present invention be dictated by the appended claims rather than by the Description of the Preferred Embodiment.

What is claimed is:

1. A free fall simulator comprising:
   a flight chamber;
   at least one fan positioned below said flight chamber;
   a noise attenuation housing substantially enclosing said at least one fan; and
   a plurality of air intake openings in said housing, wherein one or more of said air intake openings face upwardly.

2. The free fall simulator of claim 1 wherein said housing includes a canopy extending radially outwardly from said flight chamber.

3. The free fall simulator of claim 2 wherein said canopy includes an outer peripheral edge and said housing further includes at least one noise attenuation stack positioned at the peripheral edge of said canopy and wherein at least one of said plurality of air intake openings is positioned in said at least one stack at a point above said canopy.

4. The free fall simulator of claim 3 including a plurality of said stacks.

5. The free fall simulator of claim 4 including a wall section joined along a portion of said peripheral edge and between adjacent ones of said plurality of stacks.

6. The free fall simulator of claim 1 wherein said at least one fan includes a plurality of fans, each of said fans being positioned in a radially extending air intake duct having an air intake end.

7. The free fall simulator of claim 6 wherein said housing includes an upper wall portion above said plurality of fans and said air intake ducts.

8. The free fall simulator of claim 7 wherein said upper wall portion includes an outer peripheral edge and said housing further includes at lest one noise attenuation stack positioned at the peripheral edge of said upper wall portion.

9. A free fall simulator comprising:
   a flight chamber;
   a plurality of fans below said flight chamber and corresponding to air inlet ducts extending radially outwardly from below said flight chamber;
   a generally vertically disposed noise attenuation stack in communication with said air inlet chamber, wherein said stack includes one of an open top or a plurality of openings in said top.

10. A free fall simulator comprising:
    a flight chamber;
    at least one fan positioned below said flight chamber;
    a noise attenuation housing substantially enclosing said at least one fan;
    a substantially closed hood above said flight chamber;
    a plurality of openable and closeable louvers in said hood, and
    one or more recirculation columns between said hood and said noise attenuation housing.

11. The free fall simulator of claim 10 including a temperature control for controlling the temperature within said flight chamber.

12. A free fall simulator comprising:
    a flight chamber;
    a plurality of fans below said flight chamber and corresponding air inlet ducts extending radially outwardly from below said flight chamber;
    a noise attenuation stack in communication with said air inlet chamber;
    a canopy extending radially outwardly from said flight chamber to said noise attenuation stack; and
    a plurality of air inlet openings in said stack at a point above said canopy.

13. A free fall simulator comprising:
    a flight chamber;
    at least one fan positioned below said flight chamber;
    a noise attenuation housing substantially enclosing said at least one fan and having an air inlet opening upwardly;
    a substantially closed hood above said flight chamber; and
    one or more recirculation columns in communication between said hood and said noise attenuation housing, wherein a first portion of said air inlet is open to atmospheric air and a second portion of said air inlet is in communication with one of said recirculation columns.

14. The free fall simulator of claim 13 including a noise attenuating housing associated with each of said one or more recirculation columns.

* * * * *